United States Patent [19]

Li

[11] Patent Number: 5,200,262

[45] Date of Patent: Apr. 6, 1993

[54] LAUNDERABLE RETROREFLECTIVE APPLIQUE WITH IMPROVED RETENTION OF RETROREFLECTIVE ELEMENTS

[75] Inventor: Wu-Shyong Li, Woodbury, Minn.

[73] Assignee: Minnesota Mining and Manufacturing Company, St. Paul, Minn.

[21] Appl. No.: 862,345

[22] Filed: Apr. 1, 1992

[51] Int. Cl.⁵ .......................... G02B 5/128; B32B 3/00
[52] U.S. Cl. ...................................... 428/266; 428/283; 428/284; 428/290; 428/323; 428/325; 428/328; 428/343; 428/447; 428/913; 359/536
[58] Field of Search ............... 350/105; 428/266, 283, 428/284, 290, 323, 325, 328, 343, 447, 913

[56] References Cited

U.S. PATENT DOCUMENTS

| | | | |
|---|---|---|---|
| T987,003 | 10/1979 | Johnson et al. | 356/445 |
| 3,700,305 | 10/1972 | Bingham | 350/105 |
| 3,830,682 | 8/1974 | Rowland | 350/103 |
| 4,025,159 | 5/1977 | McGrath | 350/105 |
| 4,031,120 | 6/1977 | Gervase | 556/414 |
| 4,076,671 | 2/1978 | Bright | 523/172 |
| 4,082,426 | 4/1978 | Brown | 350/105 |
| 4,153,412 | 5/1979 | Bailey | 8/471 |
| 4,263,345 | 4/1981 | Bingham | 427/163 |
| 4,356,233 | 10/1982 | Lange et al. | 428/336 |
| 4,404,379 | 9/1983 | Hajek et al. | 544/231 |
| 4,533,592 | 8/1985 | Bingham | 428/213 |
| 4,582,887 | 4/1986 | Dominguez et al. | 528/48 |
| 4,637,950 | 1/1987 | Bergeson et al. | 428/168 |
| 4,678,695 | 7/1987 | Tung et al. | 428/120 |
| 4,763,985 | 8/1988 | Bingham | 350/105 |
| 4,955,690 | 9/1990 | Bacon, Jr. | 350/105 |
| 4,983,644 | 1/1991 | Mukai et al. | 522/14 |
| 5,047,546 | 9/1991 | Parrinello et al. | 548/110 |
| 5,055,347 | 10/1991 | Bacon, Jr. | 428/250 |

FOREIGN PATENT DOCUMENTS 2-279784 11/1990 Japan .

OTHER PUBLICATIONS

ASTM D 2244-79, Standard Method for Instrumental Evaluation of Color Differences of Opaque Materials, pp. 389-397.

Primary Examiner—William J. Van Balen
Attorney, Agent, or Firm—Gary L. Griswold; Walter N. Kirn; Robert H. Jordan

[57] ABSTRACT

Retroreflective appliques comprising a monolayer of retroreflective elements partially embedded in and protruding from the front surface of a binder layer and an optional layer of adhesive on the rear surface of the binder layer, wherein the binder layer comprises one or more flexible polymeric binder materials having active hydrogen functionalities and one or more isocyanate-functional silane coupling agents thereon.

21 Claims, 1 Drawing Sheet

LAUNDERABLE RETROREFLECTIVE APPLIQUE WITH IMPROVED RETENTION OF RETROREFLECTIVE ELEMENTS

FIELD OF INVENTION

The present invention relates to novel retroreflective appliques and articles to which such appliques have been applied.

BACKGROUND

In order to improve safety of pedestrians, joggers, workers on roadways, etc., retroreflective markings have been attached to clothing. In one common embodiment, retroreflective appliques comprising a monolayer of retroreflective elements (e.g., transparent microspheres with hemispheric reflectors) partially embedded in a layer of binder material, with adhesive backings are bonded to articles of clothing. In other embodiments, the appliques are sewn onto a substrate.

A problem with such appliques is that their retroreflective performance tends to diminish unacceptably when the garment to which they are applied is washed. After just a few washings, the retroreflective brightness of the applique may be reduced to a small fraction, e.g., 5 percent or less, of its original brightness. This decrease is due to loss of retroreflective elements from the surface of the applique and/or degradation of the retroreflective elements, e.g., corrosion of aluminum hemispheric reflectors, during washing. As a result the visibility of the applique is reduced, thereby impairing the safety of the wearer.

The problem is particularly troublesome when the clothing is subjected to industrial laundering, where the conditions of laundering are often more severe than conventional home laundering. For instance, in an industrial laundry, the laundering conditions may include wash temperatures of 40° to 90° C. (105° to 190° F.) and pH of 10 to 12.5, whereas in contrast, typical conditions for home laundering may include temperatures of 4° to 60° C. (40° to 140° F.) and pH of less than 11. Also, home laundering equipment typically subjects the articles being cleaned to less rigorous handling and stress than does industrial laundry equipment.

In some embodiments, organosilane and/or zircoaluminate coupling agents have been used to improve the adhesion of the binder material to the retroreflective elements. Illustrative examples of previously known coupling agents include vinyltriethoxysilane, gamma-methacryloxypropyltrimethoxysilane, gamma-mercaptopropyltrimethoxysilane, gamma-glycidoxypropyltrimethoxysilane, gamma-aminopropyltriethoxysilane, gamma-aminopropyltrimethoxysilane, N-beta-(aminoethyl)gamma-aminopropyltrimethoxysilane, triaminofunctional trimethoxysilane, amino functional zircoaluminate, carboxy functional zircoaluminate, and mercapto functional zircoaluminate; used singly or in combination. Selection of coupling agent(s) is dependent in part upon the binder material and retroreflective elements used. To minimize fading of aluminum reflector layers, it is typically preferred that amino-containing silane coupling agents be avoided. Mercaptofunctional silane coupling agents typically exhibit a very objectionable odor. None of these coupling agents performs as well as desired in retroreflective appliques subjected to industrial wash conditions.

SUMMARY OF INVENTION

The present invention provides novel retroreflective appliques which can be applied to substrates such as fabrics and garments to impart retroreflective properties thereto. Appliques of the invention provide unexpected durability. Capable of being applied to fabric substrates, appliques of the invention exhibit surprising resistance to degradation when the article is laundered and retain a surprising degree of retroreflective properties.

In brief summary, a retroreflective applique of the invention comprises a monolayer of retroreflective elements partially embedded in and protruding from the front surface of a binder layer and an optional layer of adhesive, preferably hot melt type, on the rear surface of the binder layer. Prior to application to a substrate, typically fabric such as a flag or garment, the adhesive layer is optionally covered with a removable release liner. In some embodiments, the applique is bonded to a substrate with the optional adhesive, and in other embodiments the binder layer serves to both secure the retroreflective elements and to bond the applique to a desired substrate. If desired, the applique can be sewn onto a fabric substrate.

Appliques of the invention differ from those of the available before in that the binder layer comprises one or more flexible polymers having active hydrogen functionalities such as crosslinked, flexible urethanebased polymers (e.g., isocyanate-cured polyesters or one or two component polyurethanes) and one or more isocyanate-functional silane coupling agents.

Retroreflective appliques of the invention have been found to exhibit surprising retention of retroreflective brightness, even when subjected to industrial laundering conditions. This advantageous result is achieved through a combination of increased resistance to loss of retroreflective elements and an increased resistance to degradation of the retroreflective elements, e.g., degradation of the reflector layer. As a result, articles to which appliques of the invention have been applied may be laundered many more times than previously possible while still retaining desired retroreflective character.

BRIEF DESCRIPTION OF DRAWING

The invention will be further explained with reference to the drawing, wherein.

These figures, which are idealized, are not to scale and are intended to be merely illustrative and non-limiting.

DETAILED DESCRIPTION OF ILLUSTRATIVE EMBODIMENTS

Figure 1:
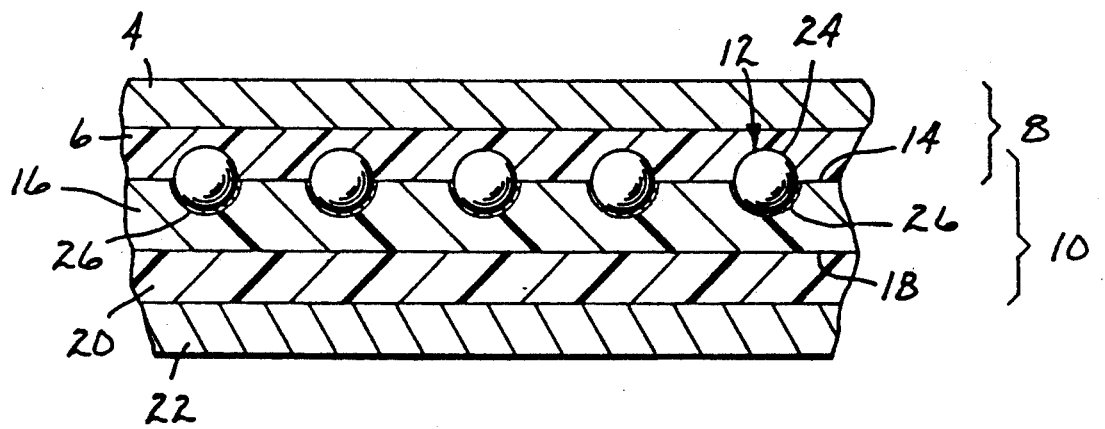
FIG. 1 is cross-sectional illustration of a portion of an illustrative embodiment of a retroreflective applique of the invention.

Reference is made to FIG. 1 wherein is shown an illustrative embodiment of retroreflective applique 10 of the invention. Applique 10 comprises a monolayer of retroreflective elements 12 partially embedded in and protruding from front surface 14 of binder layer 16. Disposed on rear surface 18 of binder layer 16 is optional adhesive layer 20. Applique 10 is shown with optional release liner 22 which covers the exposed surface of adhesive layer 20. To apply applique 10 to a substrate such as a fabric (not shown), release liner 22 is first removed. Applique 10 is shown with optional temporary carrier 8 comprising paper sheet 4 and polymer lining 6.

Figure 2:
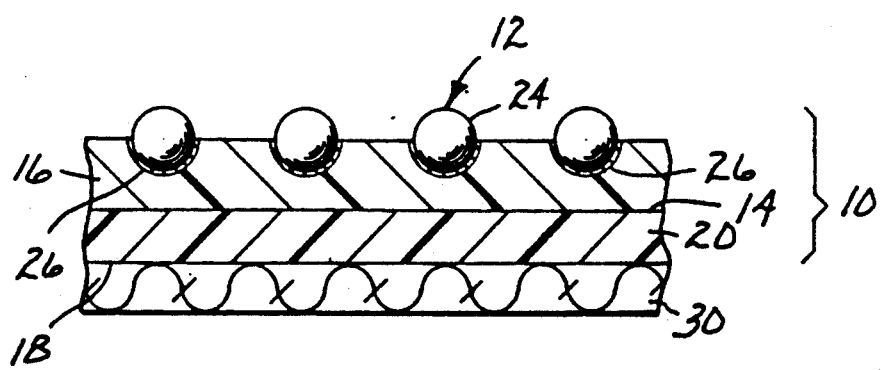
FIG. 2 is cross-sectional illustration of a portion of another illustrative embodiment of a retroreflective applique of the invention bonded to a substrate.

FIG. 2 shows retroreflective applique 10 on substrate 30, e.g., an article of clothing such as a jacket or vest.

In brief summary, a typical method of making appliques of the invention comprises arranging retroreflective elements in desired monolayer arrangement on a temporary carrier with the rear portions of the retroreflective elements presented away from the carrier, forming a binder layer over the rear portions of the retroreflective elements, and applying an optional adhesive layer on the back side of the binder layer.

The most typical form of retroreflective elements 12 will be spherical microspheres 24 having reflectors 26 on the back sides thereof as shown in FIG. 1. As known to those skilled in the art, one method for assembling a monolayer of such retroreflective elements is to cascade microspheres onto temporary carrier 8 which secures microspheres 24 in desired arrangement teaporarily. For instance, microspheres 24 can be partially embedded in heat softenable polymer layer 6 on paper sheet 4. Some examples of useful polymer coatings include polyvinyl chloride, polysulfones, polyalkylenes such as polyethylene, polypropylene, and polybutylene, polyesters such as polyethylene terephthalate, and the like. Upon cooling, polymer layer 6 retains microspheres 24 in desired arrangement. Depending in part upon the characteristics of carrier 8 and elements 12, it may be desired to condition carrier 8 and/or elements 12 to achieve desired release properties. For instance, selected release agents or adhesion promoters may be used.

Microspheres 24 are typically preferably packed as closely as possible, ideally in their closest hexagonal arrangement, to achieve greater retroreflective brightness and may be so arranged by any convenient applique process, such as printing, screening, cascading, or with a hot can roll.

Transparent microspheres having reflectors on the rear surfaces thereof as shown in FIG. 1 typically provide satisfactory levels of retroreflective brightness over a wide range of incidence angles, i.e., the angles at which the light strikes the sheeting, a property sometimes referred to as "angularity".

If transparent microspheres are used, the microspheres are preferably substantially spherical in shape in order to provide the most uniform and efficient retroreflection. Furthermore, the microspheres are preferably substantially transparent so as to minimize the amount of light absorbed by the microspheres and thereby optimize the amount of light which is retroreflected by sheetings of the invention. The microspheres are typically substantially colorless, but, may be colored to produce special effects if desired.

Microspheres used herein may be made from glass or synthetic resin having the optical properties and physical characteristics taught herein. Glass microspheres are typically preferred because they typically cost less, are harder, and exhibit superior durability to microspheres made of synthetic resins.

Microspheres used in the present invention will typically have an average diameter of between about 30 and about 200 microns. Microspheres which are smaller than this range may tend to provide lower levels of retroreflection because of diffraction effects, whereas microspheres larger than this range may tend to impart undesirably rough texture to the applique or undesirably reduce the flexibility thereof. Microspheres used in the present invention will typically have a refractive index of between about 1.7 and about 2.0, the range typically considered to be useful in microsphere-based retroreflective products where, as here, the front surfaces of the microspheres are exposed or air-incident.

As mentioned above, microsphere-based retroreflective elements of retroreflective appliques of the invention have reflectors on the rear surfaces thereof. Typically, such reflectors are applied to the rear surfaces of the microspheres after the microspheres have been partially embedded in the carrier, thereby facilitating the arrangement of the microspheres in substantially uniform direction for retroreflection. Furthermore, as is known, the size of reflectors, i.e., how much of the surface of the microspheres which is covered, may be controlled in part by controlling the depth into the carrier to which the microspheres are embedded prior to application of the reflectors thereto.

Among the variety of materials which may be used as reflectors are vacuum-deposited or vapor-coated metal coatings, such as aluminum or silver; chemically-deposited metal coatings, such as silver; metal-coated plastic films; metal flakes; such as aluminum or silver; and dielectric coatings. Aluminum or silver coatings are typically preferred, because they tend to provide the highest retroreflective brightness. The reflective color of silver coatings is typically preferred to that of aluminum coatings, but an aluminum vapor coat is normally more preferred, because silver reflective coatings typically suffer more severe degradation in outdoor exposure than do aluminum coatings. U.S. Pat. No. 3,700,305 (Bingham) discloses dielectric mirrors or coatings that may be used as reflectors in retroreflective articles of the invention.

An advantage of dielectric reflectors is that appliques made with microspheres having such reflectors may be easily made in a variety of bright colors. Such reflectors are typically subject to degradation under laundering conditions, particularly industrial laundering conditions, and are accordingly used on articles destined for home laundering. Aluminum and silver reflectors typically exhibit substantially greater durability under industrial laundering conditions, but aluminum reflectors often tend to impart a gray color to the applique under ambient conditions.

Following arrangement of reflective elements 12, a composition forming binder layer 16 is applied thereover. Binder layer 16 is typically between about 50 and about 250 microns (2 and 10 mils) thick over the embedded portion of retroreflective elements 12, with thicknesses of between about 75 and about 100 microns (3 and 4 mils) typically being preferred. It will be understood that binder layers having thicknesses outside these ranges may be used. However, if binder layer 16 is too thin, it will not provide sufficient support to retroreflective elements 12 which will may be readily dislodged, whereas increasing the thickness of binder layer 16 leads to increased cost for applique 10 as greater amounts of the binder material are required. Furthermore, at greater thicknesses the flexibility of applique 10 typically tends to decrease.

Binder layer 16 may consist essentially of one or more binder materials and one or more coupling agents as discussed herein.

Illustrative examples of suitable binder materials include isocyanate-curable polyesters such as copolyester resins sold in the VITEL ™ series by Goodyear Tire and Rubber Company and polyester resins sold in the BOSTIK T ™ series by Emhart Corporation. Suitable binder materials also include such polyols as polytetramethylene oxide glycol, polyester polyol, hydroxy-terminated polybutadiene, polycaprolactone polyol, polybutylene oxide glycol, and polypropylene oxide glycol. Others illustrative examples include the aliphatic and aromatic polyisocyanates sold in the DESMODUR ™ and MONDUR ™ series by Mobay Company.

Binder layer 16 further comprises one or more isocyanate-functional coupling agents (e.g., gamma-isocyanatopropyltreithoxysilane) to promote adhesion of binder layer 16 to retroreflective elements 12.

The coupling agent(s) may be applied, e.g., by spraying or coating, to the surfaces of the retroreflective elements or to the binder layer prior to its application to the elements or may be incorporated directly into the binder composition. Application to the elements provides the advantage of using lesser quantities of coupling agent, which in some instances is relatively expensive, whereas incorporation into the binder composition provides the advantage of eliminating a separate application process curing fabrication of the retroreflective applique.

Typically, an amount of isocyanate-functional coupling agent(s) in stoichiometric excess to the active hydrogen-containing binder material(s) is used. Generally, the higher the molecular weight of the coupling agent(s) employed, the greater amount of such agents required in order to attain the desired excess of isocyanate groups for linkage with the binder material. Typically, binder layer 16 will contain up to about 10 weight percent, and preferably between about 0.1 and about 7 weight percent, of coupling agent. If too little coupling agent is used, the resultant applique may, depending upon the characteristics of the binder material, tend to undergo undesirable loss of retroreflective elements. If too much coupling agent is used, it may in some instances impair the physical properties of the binder layer, e.g., cause the binder layer to swell. Also, the coupling agents are typically relatively expensive as compared to the other components of the appliques.

As mentioned above, appliques of the invention may be sewn onto substrates if desired. In some applications, however, it is desired to secure the applique to the substrate by adhesive. Accordingly, in some embodiments, appliques of the invention will have an adhesive layer on the back side of the binder layer. The adhesive is selected to provided suitable adhesion properties of the binder layer and the intended substrate, preferably taking into account the conditions to which the applique and substrate will be subjected, e.g., high humidity, low temperature, etc. In some embodiments, the adhesive layer may be a layer of the same composition used to form the binder layer which is not fully cured until the applique is contacted to a substrate. Preferably the binder layer sufficiently cured prior to application of such an addition layer and/or application to a substrate to facilitate handling of the applique and ensure retention of the retroreflective elements. Alternatively, the adhesive layer may be of a different composition. If desired, pressure-sensitive adhesives or activated adhesives (e.g., heat-activated, ultraviolet-activated) may be used. For instance, an iron-on applique may be provided by using a layer of suitably melting thermoplastic material.

Binder layer 16 may also contain one or more optional additives such as colorants (e.g., pigments, dyes, metal flakes), fillers, stabilizers (e.g., thermal stabilizers and antioxidants such as hindered phenols and light stabilizers such as hindered amines or ultraviolet stabilizers), flame retardants, and flow modifiers (e.g., surfactants such as fluoropolymer silicones). Preferably the additives are resistant to degradation or leaching out of the binder layer during laundering.

The binder layer typically contains colorant (e.g., pigments or dyes) to camouflage discoloration of the binder material and/or impart desired ambient color appearance to the applique. Typically a black colorant is preferred because it provides the most effective camouflage of discoloration of the binder material. An applique comprising microspheres with aluminum reflectors as retroreflective elements and black colorant will typically exhibit a pleasing silver appearance. Preferred colorants for appliques with reflective elements having aluminum reflector layers are black dyes, e.g., metal-azo dyes such as chromium-azo dyes. The binder layer typically contains between about 0.01 and about 2.0 weight percent, preferably between about 0.1 and about 0.5 weight percent of dye.

EXAMPLES

The invention will be further explained by the following illustrative examples which are intended to be non-limiting. Unless otherwise indicated, all amounts are expressed in parts by weight.

Unless otherwise indicated, the following test methods were used.

After lamination to a fabric, the temporary carrier was stripped from the front of the subject applique to reveal the silver colored retroreflective surface, retroreflective brightness was measured using a retroluminometer as described in U.S. defensive publication T987,003 at divergence angles of about 0.2° and entrances angles of about −4°.

Launderability of appliques was evaluated by washing a piece of fabric to which the subject applique had been applied for the indicated number of cycles in a commercial Milnor System 7 Washing Machine Model 30015M4G from Pellerin Minor Corp. using program no. 7 for heavily soiled, colored fabric with the indicated detergent. Each cycle is about 1 hour in length. The washer was loaded with from one to four pieces of fabric (about 2 feet by 3 feet in size) having several (typically ten or more) appliques of the invention about 2.5 by 15 centimeters (1 by 6 inches) in size sewn or bonded thereto and used about 68 liters (18 gallons) of water at 74° C. (166° F.). Unless otherwise indicated, the cleaning agents used were 30 grams of FACTOR ™ Detergent (from Fabrilife Chemicals, Inc. containing tetrasodium pyrophosphate, nonylphenoxypoly(ethyleneoxy)ethanol, sodium carbonate, and silica, and 90 grams of ULTRASIL ™ (a pH builder from Pennwalt Corp. believed to contain 40 weight percent NaOH and 60 weight percent sodium metasilicates). The retroreflective brightness of the middle of each sample was determined periodically. The results are expressed below as the percentage of its initial retroreflective brightness the sample retained after the indicated number of wash cycles.

EXAMPLE 1 AND COMPARATIVE EXAMPLE A

Glass microspheres having an average diameter of about 40 to 90 microns were partially embedded into a temporary carrier sheet and aluminum specular reflective layers applied to the exposed portions of the microspheres to yield retroreflective elements.

A binder composition comprising:

| Amount | Component |
|---|---|
| 100 | Binder Material - 50 weight percent solids solution in methyl ethyl ketone/toluene (1:1 weight ratio) of VITEL TM VPE-5545, a linear saturated polyester from Goodyear; |
| 2.4 | Binder Material - MONDUR TM CB75, a 75 weight percent solids solution in ethyl acetate of an aromatic polyisocyanate based on adduct of toluene diisocyanate, from Mobay Chemical Company; |
| 2.0 | Coupling Agent - UNION CARBIDE TM Y9030, a gamma-isocyanatoproyltriethoxysilane; and |
| 0.2 | Catalyst - dibutyltindilaurate; | was coated over the retroreflective elements to a wet thickness of about 175 microns (7 mils) and dried at about 66° C. (150° F.) for 5 minutes than at 107° C. (225° F.) for another 5 minutes to yield a binder layer. An additional layer of the same composition was then applied to a wet thickness of about 200 microns (8 mils) to act as an adhesive layer.

The resultant retroreflective applique, referred to as Example 1, was then wet laminated to a polyester fabric (S-551-060 from Milliken & Company, a 3.11 ounce/yard$^2$ textile polyester) and the construction dried and cured at 66° C. (150° F.) for 5 minutes and then at 107 C. (225 F.) for 5 minutes. In Comparative Example A, an applique was made as in Example 1, except 2 parts of UNION CARBIDE TM Y9492, an amino-functional silane, was used instead of the isocyanate-functional coupling agent and the amount of CB75 was increased to 4.3 parts to accommodate the active hydrogen in the substitute coupling agent.

The appliques of Experiment 1 and Comparative Experiment A had initial retroreflective brightnesses in candelas per square meter per lux ("cpl") of about 600 and 590, respectively. The launderability results obtained are tabulated in Table I:

TABLE I

| Cycles | Ex. 1 | Ex. A |
|---|---|---|
| 0 | 100 | 100 |
| 5 | 67 | 71 |
| 10 | 46 | 13 |
| 15 | 38 | 3 |
| 20 | 35 | 2 |
| 25 | 33 | <2 |

After 5 to 10 washes, the samples of Comparative Experiment A were observed to have undergone slightly more loss of microspheres, and much more severe corrosion of vapor coat, than had the samples from Example 1.

These results illustrate the superior launderability of retroreflective appliques of the invention as compared to conventional appliques containing conventional coupling agents.

EXAMPLE 2 AND COMPARATIVE EXAMPLE B

In Example 2, an applique was made as in Example 1, except it was additionally cured at 107° C. (225° F.) for 40 minutes following the wet lamination to the polyester fabric and drying and curing. In Comparative Example B, an applique was made as in Example 2 except 2 parts of DOW CORNINGT TM Z6040, an epoxy-functional silane, was used as the coupling agent.

The appliques in Example 2 and Comparative Example B had initial retroreflective brightnesses in candelas per square meter per lux ("cpl") of about 600 and 608, respectively. The launderability results tabulated in Table II were obtained:

TABLE II

| Cycles | Ex. 2 | Ex. B |
|---|---|---|
| 0 | 100 | 100 |
| 5 | 80 | 60 |
| 10 | 53 | 25 |
| 15 | 38 | 16 |
| 20 | 31 | 13 |

EXAMPLE 3 AND COMPARATIVE EXAMPLE C

To make Example 3 a monolayer of retroreflective elements was prepared as in Example 1. A binder composition comprising:

| Amount | Component |
|---|---|
| 150 | Binder Material - 50 weight percent solids solution in methyl ethyl ketone/toluene mixture (1:1 weight ratio) of VITEL TM VPE-5545; |
| 62.5 | Binder Material - 40 weight percent solids solution in methyl ethyl ketone of polyol based on polytetramethylene oxide having hydroxy equivalent weight of 3000; |
| 4.0 | Coupling agent - Y9030; |
| 4.5 | Binder Material - MONDUR TM CB75; and |
| 0.02 | Catalyst - dibutyltindilaurate; | was coated over the aluminum-coated microspheres to a wet thickness of about 175 microns (7 mils) and dried at 66° C. (150° F.) for 5 minutes then at 107° C. (225° F.) for 5 minutes to yield the binder layer. An additional layer of the same composition was then coated at a wet thickness of about 200 microns (8 mils). The construction was wet laminated to a polyester fabric like that used in Example 1 and dried and cured at 66° C. (150° F.) for 5 minutes and at 107° C. (225° F.) for 5 minutes.

In Comparative Example C, an applique was made as in Example 3 except DOW CORNING TM Z6040, an epoxy-functional silane, was used as the coupling agent.

The appliques in Example 3 and Comparative Example C had initial retroreflective brightnesses (in cpl) of about 594 and 582, respectively. The launderability results tabulated in Table III were obtained:

TABLE III

| Cycles | Ex. 3 | Ex. C |
|---|---|---|
| 0 | 100 | 100 |
| 5 | 46 | 11 |
| 10 | 35 | 8 |
| 15 | 31 | 6 |
| 20 | 30 | 4 |

EXAMPLES 4 AND 5 AND COMPARATIVE EXAMPLE D

To make Example 4 a binder composition comprising:

| Amount | Component |
|---|---|
| 100 | Binder Material - 50 weight percent solids solution in methyl ethyl ketone/toluene mixture (1:1 weight ratio) of VITEL TM VPE-5545; |

-continued

| Amount | Component |
|---|---|
| 2.0 | Coupling agent - Y9030; |
| 2.4 | Binder Material - MONDUR TM CB75; |
| 0.2 | Catalyst - dibutylitindilaurate; |
| 0.05 | Colorant - ZAPON TM Black X50, a chromium-azo dye from BASF; | was coated over aluminum-coated microspheres as in Example 1 to a wet thickness of about 150 microns (6 mils) and dried as in Example 1 to yield a binder layer. An additional layer of the same composition was coated to a wet thickness of about 200 microns (8 mils) to act as an adhesive. The construction was then wet laminated to a polyester fabric and dried and cured thereon as in Example 3.

Example 5 was the same construction except the amounts of coupling agent and CB75 were 1 and 3.6 parts, respectively.

Comparative Example D was a piece of MR-801 Retroreflective Fabric from Unitika Sparklite Company which is believed to comprise a monolayer of aluminum-coated microspheres in a urethane-based binder material.

The appliques in Examples 4 and 5 and Comparative Example D had initial retroreflective brightnesses (in cpl) of about 570, 584, and 671, respectively. The launderability results tabulated in Table IV were obtained:

TABLE IV

| Cycles | Ex. 4 | Ex. 5 | Ex. D |
|---|---|---|---|
| 0 | 100 | 100 | 100 |
| 10 | 71 | 72 | 45 |
| 20 | 56 | 56 | 27 |
| 30 | 48 | 45 | 15 |
| 40 | 41 | 39 | 8 |
| 50 | 40 | 35 | 3 |
| 60 | 38 | 33 | 1 |
| 70 | 33 | 27 | <1 |
| 80 | 32 | 27 | <1 |
| 90 | 31 | 26 | <1 |
| 100 | 26 | 22 | <1 |

EXAMPLE 6 AND COMPARATIVE EXAMPLE E

To make Example 6 a binder composition as described in Example 4 was coated over a layer of aluminum-coated microspheres to a wet thickness of about 200 microns (8 mils) and left at room temperature for 5 minutes to permit some of the solvent to evaporate, leaving the surface somewhat tacky. The construction was then immediately laminated to a polyester fabric as described in Example 1 and dried as in Example 4.

In Comparative Example E, a binder composition comprising:

| Amount | Component |
|---|---|
| 100 | Binder material - 32.5 weight percent solids solution in methyl ethyl ketone of thermosetting phenolic resin (formaldehyde phenol condensate, nitrile rubber, and plasticizer (dioctyl phthalate) in 5:3.3:1 weight ratio; |
| 1.8 | Coupling Agent - UNION CARBIDE TM A189, a gamma-mercaptopropyltrimethoxysilane; |
| 0.5 | carbon black dispersion; and |
| 2.0 | titanium dioxide dispersion; | was coated over a layer of aluminum-coated microspheres at a wet thickness of about 175 microns (7 mils) and then dried and cured at 66° C. (150° F.) for 10 minutes then at 93° C. (200° F.) for 5 minutes to yield the binder layer.

An adhesive comprising 100 parts of a BOSTIK TM 7660, 30 weight percent solution in methyl ethyl ketone of polyester diol from Emhart Corporation, and 4 parts of BOSCODUR TM No. 22, a 66 weight percent solids solution of polyisocyanate from Emhart Corporation was coated over the binder layer to a wet thickness of about 225 microns (9 mils). The applique was then laminated to a piece of PRIMAL TM Fabric, an 80/20 blend of polyester and combed cotton, basis weight of 3 ounces/yard$^2$ from Springs Industries, Inc., and the construction dried and cured at 66° C. (150° F.) for 5 minutes and 104° C. (220° F.) for 10 minutes.

The samples of appliques in Examples 4 and 6 and Comparative Example E used here had initial retroreflective brightnesses (in cpl) of about 587, 591, and 579, respectively. The variation in initial brightness between the Example 4 sample used here and that used above is within the variation routinely observed in this type of product. The cleaning agents used were 180 grams of POLYSOLT TM, a cleaning concentrate containing petroleum distillates and surfactant from Atochem Company, and 180 grams of ULTRASIL TM. The launderability results tabulated in Table V were obtained:

TABLE V

| Cycles | Ex. 4 | Ex. 6 | Ex. E |
|---|---|---|---|
| 0 | 100 | 100 | 100 |
| 5 | 75 | 80 | 70 |
| 10 | 58 | 51 | 37 |
| 15 | 49 | 38 | 17 |
| 20 | 42 | 30 | 6 |
| 25 | 39 | 28 | 2 |
| 30 | 35 | 25 | <1 |
| 35 | 34 | 24 | <1 |
| 50 | 27 | 20 | <1 |

EXAMPLE 7

An applique was made as described in Example 1 except after formation of the binder layer the second layer of material used as an adhesive layer was not applied. Instead, a layer of thermoplastic polyurethane film was applied to the binder layer to yield an adhesive layer.

The resultant retroreflective applique was applied to a polyester/cotton fabric (65/35) and heat laminated at 190° C. (375° F.) for 10 seconds in a HIX HT-400 Laminator.

The applique had an initial retroreflective brightnesses of about 524 cpl. The cleaning agents used were 30 grams of FACTORT TM Detergent and 60 grams of ULTRASILI TM. The launderability results tabulated in Table VI were obtained:

TABLE VI

| Cycles | Ex. 7 |
|---|---|
| 0 | 100 |
| 5 | 82 |
| 10 | 55 |
| 15 | 44 |
| 20 | 40 |
| 25 | 38 |

Various modifications and alterations of this invention will become apparent to those skilled in the art without departing from the scope and spirit of this invention.

What is claimed is:

1. A retroreflective applique comprising a monolayer of retroreflective elements partially embedded in and protruding from the front surface of a binder layer wherein said binder layer comprises a flexible polymer having active hydrogen functionalities and one or more isocyanate-functional silane coupling agents.

2. The applique of claim 1 wherein said binder layer comprises at least one of the following polymers: polyisocyanate-cured polyester, one component polyurethane, or two component polyurethane.

3. The applique of claim 1 wherein said coupling agent is gammaisocyanatopropyltriethoxysilane.

4. The applique of claim 1 wherein said binder layer comprises between about 0.1 and about 10 weight percent of said coupling agent.

5. The applique of claim 1 wherein said binder layer comprises between about 0.1 and about 7 weight percent of said coupling agent.

6. The applique of claim 1 wherein said binder layer comprises between about 0.5 and about 4 weight percent of said coupling agent.

7. The applique of claim 1 wherein said binder layer further comprises at least one of the following: filler, colorant, stabilizer, flame retardant, and flow modifier.

8. The applique of claim 1 wherein said binder layer is between about 50 and 250 microns thick.

9. The applique of claim 1 wherein said binder layer is between about 75 and 100 microns thick.

10. The applique of claim 1 further comprising a piece of fabric.

11. The applique of claim 10 wherein said piece of fabric is bonded to the back of said binder layer by an adhesive layer.

12. The applique of claim 10 wherein said piece of fabric is sewn to said binder layer.

13. The applique of claim 1 further comprising a layer of adhesive on the rear surface of said binder layers.

14. The applique of claim 13 wherein said adhesive is an activated adhesive.

15. The applique of claim 13 wherein said adhesive is a pressure-sensitive adhesive.

16. The applique of claim 13 wherein said adhesive contains flame retardant.

17. The applique of claim 10 wherein said fabric has been treated with flame retardant.

18. The applique of claim 1 wherein said retroreflective elements comprise microspheres with hemispheric reflectors thereon.

19. The applique of claim 18 wherein said reflectors comprise vapor-coated aluminum.

20. The applique of claim 19 wherein said reflectors comprise dielectric vapor coats.

21. An article of clothing with an applique of claim 1 attached thereto.

* * * * *

UNITED STATES PATENT AND TRADEMARK OFFICE
CERTIFICATE OF CORRECTION

PATENT NO. : 5,200,262  
DATED : April 6, 1993  
INVENTOR(S) : Wy-Shyong Li

Page 1 of 2

It is certified that error appears in the above-indentified patent and that said Letters Patent is hereby corrected as shown below:

In Column 2, line 29, the word "urethanebased" should read --urethane-based--.

In Column 4, line 58, delete the word "will".

In Column 5, line 59, insert the word --is-- between the words "layer" and "sufficiently".

In Column 7, line 21, the word "than" should read --then--.

In Column 7, line 31, "107C." should read --107°C.--.

In Column 7, line 31, "(225F.)" should read --(225°F.)--.

In Column 10, line 11, "PRIMAL$^{TM}$" should read --PRIMALUX$^{TM}$--.

In Column 10, line 24, "POLYSOLT$^{TM}$" should read --POLYSOL$^{TM}$--.

In Column 10, line 55, "FACTORT$^{TM}$" should read --FACTOR$^{TM}$--.

In Column 10, line 56, "ULTRASILI$^{TM}$" should read --ULTRASIL$^{TM}$--.

UNITED STATES PATENT AND TRADEMARK OFFICE
CERTIFICATE OF CORRECTION

PATENT NO. : 5,200,262
DATED : April 6, 1993
INVENTOR(S) : Wy-Shyong Li

It is certified that error appears in the above-indentified patent and that said Letters Patent is hereby corrected as shown below:

In Column 11, line 15, the word "gammaisocyanatopropyltriethoxysilane" should read --gamma-isocyanatopropyltricthoxysilane--.

In Column 12, line 11, the last word "layers" should read --layer--.

Signed and Sealed this

Twenty-ninth Day of March, 1994

Attest:

BRUCE LEHMAN

Attesting Officer    Commissioner of Patents and Trademarks